United States Patent [19]

Phillips

[11] 4,248,304
[45] Feb. 3, 1981

[54] LARGE SCALE PRODUCTION OF INEXPENSIVE FLOODING POLYMERS FOR TERTIARY OIL RECOVERY

[75] Inventor: Kenneth G. Phillips, River Forest, Ill.

[73] Assignee: Nalco Chemical Company, Oak Brook, Ill.

[21] Appl. No.: 94,991

[22] Filed: Nov. 16, 1979

[51] Int. Cl.³ .............................................. E21B 43/22
[52] U.S. Cl. ................................. 166/300; 166/305 R
[58] Field of Search ............... 166/270, 273, 274, 275, 166/294, 295, 300, 305 R; 252/8.55 D

[56] References Cited

U.S. PATENT DOCUMENTS

| | | | |
|---|---|---|---|
| Re. 28,576 | 10/1975 | Anderson et al. | 260/29.6 H |
| 2,827,964 | 3/1958 | Sandiford et al. | |
| 3,002,960 | 10/1961 | Kolodny | 252/8.55 D X |
| 3,039,529 | 6/1962 | McKennon | |
| 3,282,337 | 11/1966 | Pye | |
| 3,284,393 | 11/1966 | Vanderhoff et al. | |
| 3,624,019 | 11/1971 | Anderson et al. | 260/29.2 H |
| 3,724,547 | 4/1973 | Bott | 166/274 |
| 3,734,873 | 5/1973 | Anderson et al. | 260/29.6 H |
| 3,780,806 | 12/1973 | Bott | 166/275 |
| 3,841,399 | 10/1974 | Ryan | 166/300 |
| 3,852,234 | 12/1974 | Venema | 252/8.55 D X |
| 3,893,510 | 7/1975 | Elphingstone et al. | 166/295 |
| 4,016,086 | 5/1977 | Norton et al. | 166/275 X |
| 4,034,809 | 7/1977 | Phillips et al. | 166/270 |
| 4,069,161 | 1/1978 | Pogers | 166/275 X |
| 4,182,417 | 1/1980 | McDonald et al. | 166/274 X |

Primary Examiner—James A. Leppink
Assistant Examiner—George A. Suchfield
Attorney, Agent, or Firm—John G. Premo; Robert A. Miller

[57] ABSTRACT

In a process for recovering oil from underground formations of the type wherein a dilute aqueous solution of an acrylamide polymer is injected into one or more wells the improvement which comprises: establishing near the one or more wells a small chemical plant and a source of acrylonitrile for producing an acrylamide polymer in the form of water-in-oil emulsion, which plant performs the following sequence of steps:

1. Forming a water-in-oil emulsion of acrylonitrile utilizing as an oil source crude oil recovered from the underground formation;
2. Contacting said emulsion with a conversion catalyst under reaction conditions to convert a substantial portion of the acrylonitrile to acrylamide thereby forming a water-in-crude-oil emulsion which contains a substantial portion of acrylamide;
3. Polymerizing the water-in-crude-oil emulsion of acrylamide in the presence of a free radical catalyst to provide a water-in-crude-oil emulsion of acrylamide polymers, and then;

Injecting the water-in-crude-oil emulsion of the acrylamide polymer in the presence of an inverting agent into the underground formation under conditions whereby the formation is contacted with the dilute solution of the acrylamide polymer.

5 Claims, No Drawings

LARGE SCALE PRODUCTION OF INEXPENSIVE FLOODING POLYMERS FOR TERTIARY OIL RECOVERY

It is now well-known that acrylamide polymers, which term means homopolymers of acrylamide and more specifically acrylamide polymers which contains from 0.8 up to 70 percent by weight of acrylic acid in a water-soluble form, when used as dilute aqueous solutions and injected into underground petroleum bearing formations, are capable of improving the yield of crude oil from producing wells. This phenomenon which is known as water flooding with polymers, polymer flooding, tertiary recovery, etc., is described in U.S. Pat. No. 2,827,964, and U.S. Pat. No. 3,039,529, the disclosures of which are incorporated herein by reference.

In U.S. Pat. No. 2,827,964, polymer flooding is described as follows:

"The present invention is based on our discovery that certain water-soluble partially hydrolyzed acrylamide polymers are particularly well adapted for use as viscosity-increasing additives in aqueous flooding media, and that increased recovery of oil can be realized by the above described flooding or driving techniques employing a viscous aqueous solution of such agent as the flooding or driving medium. Such polymers are exceptionally stable with respect to precipitation from aqueous solutions by heat and/or mineral anions and cations, and relatively small amounts are effective in achieving the desired increase in viscosity. The invention thus consists in a secondary recovery process in which a flooding medium consisting essentially of a viscous aqueous solution of a water-soluble partially hydrolyzed acrylamide polymer of the type hereinafter described is injected into an input well which penetrates an oil-bearing formation and is thereafter forced through said formation toward an output wall penetrating the same. In the interests of economy, it is preferred to employ the viscous flooding medium as a relatively small volume plug in advance of a conventional non-viscous flooding medium, e.g., water.

The partially hydrolyzed acrylamide polymers which are employed in accordance with the invention are water-soluble acrylamide polymers which have been hydrolyzed to such an extent that between about 0.8 and about 10 percent of the amide groups have been converted to carboxyl groups. As herein employed, the term "acrylamide polymer" is inclusive of the homopolymers of acrylamide, i.e., polyacrylamide, and water-soluble copolymers of acrylamide with up to about 15 percent by weight of other polymerizable vinyl compounds such as the alkyl esters of acrylic and methacrylic acids, methacrylamide, styrene, vinyl acetate, acrylonitrile, methacrylonitrile, vinyl alkyl ethers, vinyl chloride, vinylidene chloride, etc. Such copolymers are conventionally obtained by subjecting a suitable mixture of the monomers to polymerizing conditions, usually under the influence of a polymerization catalyst such as benzoyl peroxide. In addition to the aforementioned limitation on the extent of hydrolysis, the acrylamide polymers suitable for use in accordance with the invention are of sufficiently high molecular weight that a 0.5 percent by weight aqueous solution thereof has a viscosity of at least about 4, preferably at least about 10, centipoises (Ostwald) at 21.4° C. In order to facilitate ready solution of the polymer in the aqueous flooding medium it is preferable that it be employed in finely-divided form. The general manner in which acrylamide is polymerized or copolymerized and thereafter partially hydrolyzed to form the present viscosity-increasing additives is well known in the polymer art. Preferably the polymerization or copolymerization catalysts and/or specific conditions of temperature and pressure to form long chain polymeric molecules which are characterized by a minimum of cross-linkages. The molecular weight is likewise controlled by varying the polymerization conditions and/or the catalyst employed. Hydrolysis of the polymers is accomplished by reacting the polymer with sufficient of a base, e.g., sodium hydroxide, to hydrolyze between about 0.8 and about 10 percent of the amide groups present in the polymer molecule. The resulting product consists of a long hydrocarbon chain the alternate carbon atoms of which bear either amide or carboxylic groups, with the ratio of amide to carboxylic groups being between about 9/1 and about 124/1. A number of partially hydrolyzed acrylamide polymers suitable for use in practice of the invention are commercially available, one of such products being marketed by The Dow Chemical Company under the trade name "Separan"."

This patent teaches the use of acrylamide polymers having from 0.8 to 10 percent by weight of the amide groups hydrolyzed to acrylic acid groups. U.S. Pat. No. 3,039,529 teaches the recovery of crude oil is improved further the acrylamide polymers contain between 12 to about 70 percent by weight of acrylic acid salt groups.

Further improvements in the processes described by these patents are set forth in U.S. Pat. Nos. 3,343,601, 3,399,725, and 3,282,337, the disclosure of these patents are also incorporated herein by reference. They basically teach that acrylamide polymers described above are more effective in their operational efficiency if the aqueous flooding media is substantially free of molecular oxygen.

Acrylamide polymers as well as other water-soluble vinyl polymers and copolymers may be formed into or prepared by polymerization in the form of water-in-oil emulsions. Such emulsions are described in Vanderhoff U.S. Pat. No. 3,284,393, the disclosure of which is incorporated herein by reference. This patent teaches that acrylamide and other water-soluble vinyl polymers may be polymerized by forming a water-in-oil emulsion of these monomers utilizing a water-in-oil emulsion agent which has a low HLB, e.g., 4–9. This emulsion is then polymerized in the presence of a free radical catalyst under conditions whereby the monomers are converted into a water-in-oil emulsion of their corresponding polymers. The Vanderhoff patent then treats these emulsions to precipitate the polymers as a substantially dry product. This patent does not teach direct solubilization of the polymers in water.

It is also known that the water-in-oil emulsions of water-soluble vinyl polymers and particularly acrylamide polymers, e.g., those containing from 0.8–70 percent by weight of acrylic acid or its salts may be inverted into water under conditions whereby the water-soluble polymers are dissolved rapidly, e.g., usually within two minutes and often times within a few seconds. This technique of rapid dissolution is described in Anderson/Frisque U.S. Pat. Nos. Re. 28,474, and Re. 28,576 which are incorporated herein by reference.

A preferred method of inverting the water-in-oil emulsions of the water-soluble vinyl polymers as taught in the Anderson/Frisque patents is to add the emulsions of the polymers to water which contains a surfactant which has a high HLB, e.g., in excess of 9 and usually greater than 11 which causes the inversion to occur. The surfactant may be added separately to the water into which the emulsions may be inverted or may be added to the emulsion of the polymer prior to addition to water.

It is further known that water-in-oil emulsions may be inverted in accordance with Anderson/Frisque disclosures to produce improved results in water flood operations. This is shown in the Bott U.S. Pat. Nos. 3,724,547, 3,780,806, 3,721,295 and 3,779,316, the disclosures of which are incorporated herein by reference. These patents show that the water-in-oil emulsions containing the water-soluble vinyl polymers may be either inverted into water which is then injected into the underground formations or the emulsion per se either as produced or diluted with a hydrocarbon liquid may be injected into the formation in the presence of a surfactant to cause inversion to take place in the formation.

While the teachings of the Bott patents described above represent an improved method of secondary recovery they have not been used extensively to increase crude oil production using water flooding techniques. The reason attributed towards not using the Bott techniques is due to the high cost of manufacturing both acrylamide monomer and acrylamide polymers in the form of water-in-oil emulsions. If it were possible to economically produce the water-in-oil emulsion so as to reduce their cost to those using water flooding techniques, an advance would be made in the art. Of further advantage would be the manufacture of these emulsions directly at the site of the water flooding operations. This would eliminate the shipping the emulsion from a distant manufacture site.

Also of further advantage would be the manufacture of the emulsions of the acrylamide polymers at the well site which would utilize a portion of the crude oil produced from the field and in certain instances the produced connate water.

THE INVENTION

In a process for recovering oil from underground formations of the type wherein a dilute aqueous solution of an acrylamide polymer is injected into one or more wells the improvement which comprises: establishing near the one or more wells a small chemical plant and a source of acrylonitrile for producing an acrylamide polymer in the form of water-in-oil emulsion, which plant performs the following sequence of steps:
1. Forming a water-in-oil emulsion of acrylonitrile utilizing as an oil source crude oil recovered from the underground formation;
2. Contacting said emulsion with a conversion catalyst under reaction conditions to convert a substantial portion of the acrylonitrile to acrylamide thereby forming a water-in-crude-oil emulsion which contains a substantial portion of acrylamide;
3. Polymerizing the water-in-crude-oil emulsion of acrylamide in the presence of a free radical catalyst to provide a water-in-crude-oil emulsion of acrylamide polymer, and then;
Injecting the water-in-crude-oil emulsion of the acrylamide polymer in the presence of an inverting agent into the underground formation under conditions whereby the formation is contacted with a dilute solution of the acrylamide polymer.

In a preferred form of the invention, a small chemical plant is set up near the injection point located at the crude oil recovery field. One of the main items of this plant is a storage vessel for acrylonitrile which may be supplied by either truck or from a rail siding. A parked tank truck or a sided railway tank car which contains acrylonitrile could be used as the acrylonitrile storage tank.

As indicated a preferred mode of the invention utilizes the crude oil as the source of oil to prepare the water-in-oil emulsions.

The first reaction is conducted in the plant for the conversion of the acrylonitrile in the form of a water-in-oil emulsion into acrylonitrile. This comprises producing acrylamide from acrylonitrile in the presence of a metallic conversion catalyst which comprises contacting a water-in-crude-oil emulsion of acrylonitrile which is contained in the dispersed aqueous phase of the emulsion under conditions whereby a substantial portion of the acrylonitrile is converted to acrylamide, which acrylamide remains in the aqueous phase of the emulsions. In a preferred embodiment of the invention the catalyst used is a finely divided metallic copper catalyst having a high degree of activity and, most preferably, a Raney copper catalyst which contains 2–45% by weight of aluminum. In another embodiment of the invention, it is possible to incorporate into the acrylonitrile water-in-crude-oil emulsion sufficient amounts of caustic such as sodium hydroxide or carbonate to convert by hydrolyzing the acrylonitrile or the produced acrylamide to sodium acrylate.

The Metallic Nitrile Conversion Catalyst

During the last several years, numerous metallic catalysts for converting nitrile and water into amides have been patented or described in the literature. A summary of these catalysts as well as literature references thereto is set forth below:

| Catalyst | Literature Reference |
|---|---|
| Raney copper, Ullman copper, reduced copper, copper on a carrier, silver cobalt, nickel, palladium and platinum. | Canadian Patent 899,380 |
| Copper in combination with nickel, chromium manganese, zinc, molybdenum, as well as oxides or sulfides of said metal. | Canadian Patent 930,377 |
| Combinations consisting essentially of 10 to 90% by weight of oxides of copper, silver, zinc or cadmium and 10 to 90% by weight of oxides of chromium or molybdenum. | U.S. Pat. No. 3,597,481 |
| Urushibara - copper chloride precipitate with zinc dust. | Watanabe in Bull. Chem., Soc. Japan, 37.1325 (1964) |
| Copper, copper oxide, copper-chromium oxide, copper-molybdenum oxide or mixtures thereof. | U.S. Pat. No. 3,631,104 |
| Reduced copper oxides in combination with other metal oxides, particularly rare earth metal oxides. | U.S. Pat. No. 3,696,152 |
| Copper prepared by reducing copper hydroxide or a copper salt. | U.S. Pat. No. 3,758,578 |
| Copper metal. | U.S. Pat. No. 3,767,706 |
| Highly active Raney copper. | U.S. Pat. No. 3,920,740 |
| Zinc and cadmium oxides. | German 551,869 |
| Lithium hydroxide. | U.S. Pat. No. 3,686,307 |
| Ruthenium, rhodium, palladium, osmium, iridium or platinum. | U.S. Pat. No. 3,670,021 |
| Fatty acid salts of cadmium, zinc, copper, cobalt, lead, tin, titanium, nickel, iron, mercury; | Jap. 70/21,295. Inoue et al., Ashi Kasei Co., 7-18-70. |

| Catalyst | Literature Reference |
| --- | --- |
| sulfates, nitrates and halides of lead, tin, titanium, nickel, iron, mercury; tin, cadmium & copper oxides; copper powders. | |
| Cupric hydroxide, manganese dioxide, chromium, tungsten, iron or nickel oxide. | Japan 72/33,327 |
| Boron hydroxide & inorganic phosphorous containing acids. | Japan 73/36118 |
| Cobalt chromium catalyst. | Japan 73/39424 |
| Nickel chromium catalyst. | Japan 73/39426 |
| Ruthenium or rhodium. | Japan 73/54,021 |
| Manganese dioxide. | Haefele et al., Ind. Eng. Chem. Prod. Res. Develop. 11(3), 364-365 (1972) |
| Zinc, copper cobalt & cadmium thiocyanates, sulfates, nitrates, halides and cyanides as well as metallic zinc and metallic copper. | Spanish Patent Appl. Public No. 695205 |
| Metal salts of cation exchange Resins: | U.S. Pat. No. 3,674,848 |
| Cuprous dihydrogen phosphate. | U.S. Pat. No. 3,679,745 |
| Copper salts. | U.S. Pat. No. 3,381,034 |

Of the above catalysts, I prefer to use in the practice of my invention a special Raney copper catalyst which contains from about 2 to 45% by weight of aluminum. This catalyst in its preferred embodiment contains particles having an average particle diameter ranging from 0.002 to 0.5 inch and has a relative activity of at least about 2. Catalysts of this type as well as their method of preparation are disclosed in U.S. Pat. No. 3,920,740, the disclosure of which is incorporated herein by reference.

As will be shown hereafter, it is important that the metallic catalyst be capable of producing acrylamide from acrylonitrile and water in yields of at least 30% and, preferably, at least 50%. In certain instances, certain of the catalysts listed above are incapable of producing acrylamide in such yields under normal commercial operating conditions. It is understood, therefore, that only those catalysts capable of producing acrylamide in a 30% yield are intended to be included in my definition of a metallic conversion catalyst.

The Water-in-Crude-Oil Emulsions of Acrylonitrile

The components of the emulsions are listed below in terms of their weight percentages:
A. Acrylonitrile:
   1. Generally from 5-60%;
   2. Preferably from 20-40%; and
   3. Most preferably from 25-35%;
B. Water:
   1. Generally from 20-90%;
   2. Preferably from 20-70%; and
   3. Most preferably from 30-55%;
C. Crude Oil:
   1. Generally from 5-75%;
   2. Preferably from 5-40%; and
   3. Most preferably from 20-30%; and
D. Water-in-oil emulsifying agent:
   1. Generally from 0.1-21%;
   2. Preferably from 1-15%;
   3. Most preferably from 1.2-10%.

In the above, the general range of acrylonitrile in the emulsion is shown to be 5-60%. This concentration of acrylonitrile can be achieved in the aqueous phase of the emulsion even though it is only soluble in water up to about 7% by weight. It is contemplated that the emulsions can be a dispersion of acrylonitrile at the beginning of the reaction but the nitrile would be rapidly solubilized into the water as it was converted to acrylamide. Acrylamide-water solutions tend to form a solvent system for acrylonitrile. This is demonstrated below in Table I.

TABLE I

| Nitrile Solubility | |
| --- | --- |
| Percent by Weight of Acrylamide Solution | Percent by Weight of Nitrile in Solution Based on Water |
| 0 | 7 |
| 10 | 12.99 |
| 20 | 16.0 |
| 40 | 58.66 |
| 50 | 185.6 |
| 60 | 246.0 |

As indicated, in certain instances it is desirable that the acrylonitrile emulsions, in addition to their conversion catalyst, also contain amounts of alkali metal calculated to convert varying amounts of the nitrile and/or acrylamide to sodium acrylate. The presence of the alkali also enhances the solubility of the nitrile in the aqueous phase of the emulsion as the conversion of the nitrile to the amide progresses.

It is also possible to further characterize the water-in-crude-oil emulsions of acrylonitrile with respect to the aqueous phase of the emulsions. This aqueous phase is generally defined as the sum of the acrylonitrile present in the emulsion plus the amount of water. This terminology may also be utilized in describing the water-in-crude-oil emulsions which are useful in this invention. Utilizing this terminology, the aqueous phase of the water-in-crude-oil emulsions of this invention generally consists of 25-95% by weight of the emulsion. Preferably, the aqueous phase is between 60-90% and, most preferably, from 65-85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-crude-oil emulsions of this invention will have a water/oil ratio of from 0.25 to 18. Preferably, the water-in-crude-oil ratio will range from 0.5-14 and, most preferably, from 1.0-2.75.

THE CRUDE OILS

As indicated, the invention contemplates utilizing as a source of oil crude oil which has been produced from the formation.

The crude oils utilized in preparing the emulsions may be selected from a wide variety of crude oils. As previously indicated, in most instances they would be derived from a water flood area which was being polymer flooded. The production from these floods would be subjected to conventional crude oil water separation techniques and a small portion of this crude oil would be utilized in preparing the polymer containing emulsions of the invention. Many of the crude oil emulsions produced by polymer flooding will be of the water-in-oil type. This indicates that the crude oils contain quantities of naturally occurring water-in-oil emulsifiers. Even after the crude oils are separated from their emulsions, these emulsifiers remain with the crude oil and are capable, either alone or in combination with other water-in-oil emulsifiers, of producing water-in-oil emulsions of the water-soluble vinyl addition polymer which can be polymerized to produce emulsions of these polymers which can be inverted into the formation to provide improved polymer flooding and oil recovery.

The composition of crude oil or petroleum is varied. It is disclosed in detail in Volume 14, Encyclopedia of Chemical Technology, 2nd Edition, publisher, Inter-Science, 1967, at page 845. The disclosure of this material is incorporated herein by reference. This article indicates that crude oil is composed predominantly of hydrocarbons, primarily saturated hydrocarbons. Their compositions are never the same. Oftentimes variations occur in samples of crude oil taken from the same well.

THE WATER

While any convenient source of water maybe used to produce the water-in-crude oil emulsions it is contemplated in a preferred practice of the invention that the water recovered as a result of the water flooding operation and separated from the crude oil, would be employed. Such waters would be used alone or they may be blended with other water sources such as well waters, pond, river and stream waters.

The Water-in-Oil Emulsifying Agents

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. It is also contemplated, however, that other water-in-oil emulsifying agents can be utilized.

U.S. Pat. No., 3,997,492, shows the use of emulsifiers generally having higher HLB values to produce stable emulsions. With the use of the equations present in this reference, which is hereinafter incorporated by reference, emulsifiers having HLB values between 4–9 can be utilized in the practice of this invention.

As indicated, it is possible to conduct the conversion of the acrylonitrile to acrylamide in the presence of an alkali such as sodium hydroxide or carbonate which converts a portion of the nitrile or amide groups to sodium acrylate groups. The rate of caustic hydrolysis of acrylonitrile sodium acrylate is described in the work, *The Chemistry of Acrylonitrile,* American Cyanamid Company, 1959, Page 11 and 258[1]. For the alkaline hydrolysis of acrylamide, reference should be made to the publication, *Chemistry of Acrylamide,* American Cyanamid Company, 1969, Page 7. These publications are incorporated herein by reference.
[1] 737. Mamiya, J. Soc. Chem. Ind., Japan 44,860 (1941).

One of the interesting features of the invention is that when the emulsions of the acrylonitrile are prepared using sufficient quantities of low HLB water-in-oil emulsion agents, the acrylamide produced remains in the aqueous phase of the water-in-oil emulsion. In this form it can be utilized directly in the water-in-oil polymerization system previously described.

Conversion Conditions

As a general rule, the conversion of the acrylonitrile to acrylamide may be conducted at temperature ranges from 150°–300° F. with temperatures in the range of 160°–250° being preferred. The preferred catalyst is a Raney copper catalyst of the type described in U.S. Pat. No. 3,920,740, the disclosure of which is incorporated by reference. This patent also shows additional reaction conditions that may be used. While I prefer to use a metallic catalyst such as Raney copper or reduced copper catalyst of the type already described, it is to be understood that homogeneous catalysts, e.g. those which are soluble in water, may be used. Such catalysts would be amine complexes of copper. In such complexes, the copper must be in the zero valence state.

THE CONVERSION OF THE ACRYLAMIDE EMULSIONS INTO ACRYLAMIDE POLYMERS

After preparing the acrylamide emulsions as described above, they are then pumped to another reactor such as a vessel or tubular reactor where they are subjected to polymerization conditions to produce the water-in-crude-oil emulsions of the acrylamide polymers. The feed for this reaction may contain substantially pure acrylamide, a blend of acrylamide and acrylic acid or a blend of acrylamide-acrylic acid having acyrlonitrile present in small amounts. The acrylic acid would be in its salt form.

The general method for the preparation of emulsions of the type described above is contained in Vanderhoff, U.S. Pat. No. 3,284,393, which is hereinafter incorporated by reference. The emulsions described above are polymerized in the presence of a free radical catalyst. As to choice of free radical catalyst, these materials may be either oil or water-soluble and may be from the group consisting of organic peroxides, Vazo type materials, redox type initiator systems, etc. Additionally, ultraviolet light, microwaves, etc., will also cause the polymerization of water-in-oil emulsions of this type.

In the manufacture of emulsions of this type, which are further detailed in U.S. Pat. Nos. 3,624,019 Re. 28,474, 3,734,873 Re. 28,576, 3,826,771, all of which are hereinafter incorporated by reference, the use of air may be employed to control polymerization. This technique is described in U.S. Pat. No. 3,767,629 which is also hereinafter incorporated by reference.

In addition to the above references, U.S. Pat. No. 3,996,180 describes the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. Pat. No. 3,915,920 discloses stabilizing water-in-oil emulsions of the type above described utilizing various oil-soluble polymers such as polyisobutylene. Employment techniques of this type provides for superior stabilized emulsions.

Of still further interest is U.S. Pat. No. 3,997,492 which describes the formation of water-in-oil emulsions of the type above described utilizing emulsifiers having HLB values of between 4–9.

The water-in-oil emulsions of the acrylamide primarily are prepared all charged to a polymerization reactor, present is a free radical polymerization catalyst with the amount of such catalyst being within the range of 0.001–1% by weight based on the oil or monomer phase depending upon the solubility of initiator, and polymerizaing said charge using a free radical polymerization catalyst or other means under free radical forming conditions and recovering the resultant water-in-oil emulsion which contains the water-soluble vinyl addition polymer.

THE FREE RADICAL CATALYSTS

These catalysts may be either oil or water-soluble. Such catalysts are described in U.S. Pat. No. 3,767,629.

Both the amounts and types of free radical initiators applicable are well known in the art. If an initiator is used, amounts up to 0.5 weight percent, based on the monomer, give good results. Preferably, the amount of initiator used will be about 0.001%–0.2%. Peroxygen compounds, in general, function well as initiators. These peroxygen compounds include, for example, ammonium persulfate, potassium persulfate, and hydrogen peroxide, a,a'-azo-bisisobutyronitrile also works well as an initiator. An initiator may be used alone or in combination with an activator to reduce the induction period of the polymerization reaction. Likewise, these activators are well known in the art. These activators form a redox system with an initiator. Sodium bisulfite and ferrous chloride activators work quite successfully in combination with potassium persulfate and hydrogen peroxide initiators, respectively, in accordance with the present invention.

In addition to using chemical catalysts, other free radical generating systems such as Van de Graaff generators, radio-active rays, X-rays, and the like may be employed.

The reaction time is widely variably depending upon the catalyst system, and ranges generally between about 10 minutes and two hours at temperatures between about 20° and 100° C.

PHYSICAL PROPERTIES OF THE WATER-IN-CRUDE-OIL EMULSIONS

These polymers dispersed in the emulsion are quite stable when the particle size of the polymer is from the range of 0.1 microns up to about 5 microns. The preferred particle size is generally within the range of 0.2 microns to about 3 microns. A most preferred particle size is generally within the range of 0.2 to 2.0 microns.

The emulsions prepared having the above composition generally have a viscosity in the range of from 50 to 1000 cps. It will be seen, however, that the viscosity of these emulsions can be affected greatly by increasing or decreasing the polymer content, oil content, or water content as well as the choice of a suitable water-in-oil emulsifier.

Another factor attributing to the viscosity of these types of emulsions is the particle size of the polymer which is dispersed in the discontinuous aqueous phase. Generally, the smaller the particle obtained the less viscous the emulsion. At any rate, it will be readily apparent to those skilled in the art as to how the viscosity of these types of materials can be altered. It will be seen that all that is important in this invention is the fact that the emulsion be somewhat fluid, i.e.: pumpable.

It is possible to produce the emulsions containing acrylamide homopolymers whereby the emulsions may be treated to convert a portion of the amide groups to acrylic acid salt groups. A method for doing this is set forth in U.S. Pat. No. 4,171,296 the disclosure of which is incorporated herein by reference. It is also possible to treat polyacrylic emulsions with caustic directly to convert a portion of the amide groups into sodium carboxylate groups. This under certain cases will tend to destabilize the emulsions. Thus does not generally present a problem since they can be used as soon as they are hydrolyzed.

THE REACTOR

The reactor for performing the reaction described thus far may be conventional design and would contain heating and cooling means such as coils. Preferably, it would be skid mounted and through appropriate piping connect to the acrylonitrile source and would also be connected to additional reaction devices which will be described hereafter.

INVERSION OF THE POLYMERIC EMULSIONS

The water-in-crude-oil emulsions of the polymer described above as indicated in the Bott patents may be inverted to produce dilute solutions of the polymers which would then be pumped into the formation through one or more injection wells. Alternatively, the emulsions containing the polymers may be directly fed to the formation. The emulsions may contain the inverting agent or the inverting agent may be previously injected into the formation.

The invention also contemplates that the formation would be pretreated or treated along with the injection of the inverted emulsions with an appropriate oxygen scavenger such as sodium sulfite to render the injection water containing the polymer oxygen free. These operations as described would be accomplished by mixing vessels, pumps, storage tanks and the like would be connected by appropriate piping and valving to the plant segments previously described.

Thus the expression is used herein, "injecting" the water-in-crude-oil emulsion in the presence of an inverting agent into the underground formation under conditions whereby the formation is contacted with the dilute solution of the acrylamide polymer means the scheme as set forth above.

As previously indicated, the emulsions are inverted by means of a surfactant which has an HLB greater than 9 and usually greater than 11. Such surfactants are described in Anderson/Frisque. The preferred inverting agent are nonionic in character and are illustrated by the following:

Examples of suitable nonionic surfactants are condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amides with five, or more, ethylene oxide units; polyethylene glycol esters of long chain fatty acid, such as tetraethylene glycol monopalmitate, hexaethyleneglycol monolaurate, nonaethyleneglycol monostearate, nonaethyleneglycol dioleate, tridecaethyleneglycol monoarachidate, tricosaethylene glycol monobehenate, tricosaethyleneglycol dibehenate, polyhydric alcohol partial higher fatty acid esters such as sorbitan tristearate, ethylene oxide condensation products of polyhydric alcohol partial higher fatty esters, and their inner anhydrides (mannitolanhydride, called Mannitan, and sorbitolanhydride, called Sorbitan), such as the emulsion even reacted they 10 molecules of ethylene oxide, pentaerythritolmonooleate reacted with 12 molecules of ethylene oxide, sorbitan monostearte reacted with 10 to 15 molecules of ethylene oxide; long chain polyglycols in which one hydroxyl group is esterified with a higher fatty acid and the other hydroxyl group is etherified with a low molecular alcohol, such as methoxypolyethylene glycol 550 monostearate (550 meaning the average molecular weight of the polyglycol ether). A combination of two or more of these surfactants may be used, e.g. a cationic may be blended with a nonionic or anionic with a nonionic.

By using the arrangement described above, the invention allows inexpensive water-in-crude-oil emulsion polymers to be used to improve crude oil production.

Having thus described my invention, I claim:

1. In a process for recovering oil from underground formations of the type wherein a dilute aqueous solution of an acrylamide polymer is injected into one or more wells the improvement which comprises: establishing near the one or more wells a small chemical plant and a source of acrylonitrile for producing an acrylamide polymer in the form of water-in-oil emulsion, which plant performs the following sequence of steps:
   1. Forming a water-in-oil emulsion of acrylonitrile utilizing as an oil source crude oil recovered from the underground formation;
   2. Contacting said emulsion with a conversion catalyst under reaction conditions to convert a substantial portion of the acrylonitrile to acrylamide thereby forming a water-in-crude-oil emulsion which contains a substantial portion of acrylamide;
   3. Polymerizing the water-in-crude-oil emulsion of acrylamide in the presence of a free radical catalyst to provide a water-in-crude-oil emulsion of acrylamide polymers, and then;

Injecting the water-in-crude-oil emulsion of the acrylamide polymer in the presence of an inverting agent into the underground formation under conditions whereby the formation is contacted with a dilute solution of the acrylamide polymer.

2. The process of claim 1 where the water-in-crude-oil emulsion of the acrylamide polymer is inverted into water prior to being injected into one or more of the wells.

3. The process of claim 1 where the water-in-crude-oil emulsion of the acrylamide polymer is inverted after being injected into the underground formation.

4. The process of claim 1 where the underground formation is maintained in an oxygen free condition by the use of an oxygen scavenger.

5. The process of claim 1 where the acrylamide polymer contains between 0.8–70 percent by weight water of acrylic acid formed by the hydrolysis of acrylamide groups.

* * * * *